United States Patent Office
3,547,824
Patented Dec. 15, 1970

3,547,824
TELLURIUM-CALCIUM MODIFIED CHROMIUM DIOXIDE

Toshihiro Mihara, Yukio Terada, and Eiichi Hirota, Osaka, Japan, assignors to Matsushita Electric Industrial Co., Ltd., Kadoma, Osaka, Japan
No Drawing. Filed Aug. 12, 1968, Ser. No. 751,724
Claims priority, application Japan, Feb. 23, 1968, 43/11,891; Feb. 28, 1968, 43/13,234
Int. Cl. C01g *37/02*
U.S. Cl. 252—62.51 9 Claims

ABSTRACT OF THE DISCLOSURE

Ferromagnetic chromium dioxide is prepared by mixing chromium trioxide, calcium (or calcium compound) and tellurium (or tellurium compound), heating the mixture at 280–480° C. in an autoclave, furnace-cooling the mixture, washing and drying. The amount of calcium is 0.01 to 10 atomic percent, and the amount of tellurium is 0.01 to 20 atomic percent. The heating of the mixture is advantageously effected in the presence therein of $NH_4^+$ ions in a weight ratio to $CrO_3$ of 0.001:1 to 0.15:1. The obtained ferromagnetic chromium dioxide has high magnetic coercive force and high saturation magnetization so that it is useful e.g. in magnetic recording tape, etc.

This invention relates to a ferromagnetic material and more particularly to a ferromagnetic chromium dioxide incorporated with a combination of calcium and tellurium, and to a method for making the same.

Since the Russian publication by S. M. Ariya et al. (Zhur. Obshei. Khim. Soviet 23, page 1241, 1953) has disclosed that ferromagnetic chromium dioxide in a single phase of rutile-type structure can be obtained by the thermal decomposition of anhydrous chromium trioxide at a temperature of 420° C. to 450° C. under an oxygen pressure of 200 to 300 atmospheres, much attention has been paid to ferromagnetic chromium dioxide in a single phase for use in magnetic recording members. Various modified chromium dioxides have been described in the literature; see, for example, U.S. Pats. No. 2,885,365; 2,923,683; 2,923,684; 2,923,685 and 3,243,260. Recent magnetic recording tape requires ferromagnetic materials having a high magnetic coercive force, a high saturation magnetization and a uniform particle size distribution for achieving a high resolution recording. From the standpoint of manufacture, it is desirable to make the objective ferromagnetic oxide by using a heating temperature as well as a reaction pressure as low as possible.

An object of the present invention is to provide ferromagnetic chromium oxide having a high magnetic coercive force and a high saturation magnetization.

A further object of the invention is to provide a method for making the objective ferromagnetic chromium oxide having a high coercive force and a high saturation magnetization by using a low heating temperature and forming pressure.

These and other objects of the invention will be apparent upon consideration of the following detailed description taken together with the claims.

The ferromagnetic chromium dioxide in a powder form according to the invention has a combination of calcium and tellurium incorporated therewith.

It has been discovered according to the present invention that ferromagnetic chromium dioxide having a combination of calcium and tellurium incorporated therewith has a higher magnetic coercive force than the chromium dioxide with a single addition of calcium or tellurium.

A high amount of said combination impairs the resultant chromium dioxide in the magnetic properties, especially in the magnetization. Chromium dioxide having a high coercive force and a high maximum magnetization is obtained by addition of said combination in an amount of not more than 30 atomic percent in total. Said combination in an amount of not more than 30 atomic percent comprises 0.01 to 10 atomic percent of calcium and 0.01 to 20 atomic percent of tellurium in accordance with the invention. The ferromagnetic chromium dioxides in such compositions have 200 to 600 oersteds of intrinsic coercive force, 1,500 to 2,500 gauss of residual magnetization and at least 3,000 gauss of maximum magnetization at room temperature.

The atomic percent referred to herein is based on a sum of the three kinds of atoms, i.e. chromium, calcium and tellurium and therefore, should be 100 atomic percent when all atomic percent of chromium, calcium and tellurium are summed up.

The coercive force (Hc), residual magnetization (Br) and maximum magnetization ($4\pi Im$) are derived from I–H hysteresis loop of the ferromagnetic material measured at maximum field of 2,000 oersteds and room temperature.

Advantageous amount of said combination is not more than 15 atomic percent in total and comprises 0.01 to 5 atomic percent of calcium and 0.01 to 10 atomic percent of tellurium. Such compositions result in the intrinsic coercive force up to 520 oersteds, the residual magnetization of at least 2,000 gauss and the maximum magnetization of at least 3,500 gauss at room temperature.

Optimum amount of said combination is not more than 5 atomic percent in total and comprises 0.01 to 2 atomic percent of calcium and 0.01 to 3 atomic percent of tellurium. Chromium dioxide in such composition has a combination of high coercive force up to 520 oersteds, high residual magnetization of at least 2,000 gauss and high maximum magnetization of at least 4,000 gauss and is characterized by uniform distribution of particle size. The particles are in an acicular form of 0.1 to 2.0 microns in length and 0.01 to 0.4 micron in width. The ratio of the length to the width ranges from 4:1 to 30:1. The particle size is determined by measuring particle sizes in electron microscope photographs of 100 powders random sampled.

The chromium dioxide in the aforesaid optimum composition exists in a single phase of rutile type tetragonal crystal structure when examined by a D3–F type X-ray diffractometer (Rigakudenki Co.), using copper $K\alpha$ radiation at 35 kv. and 15 ma. Chromium dioxide in a composition other than said optimum composition has a large amount of said tetragonal crystal structure and a small amount of other crystal structures.

It is more desirable for achieving a higher coercive force and a higher maximum magnetization that the aforesaid combination in operable composition, in advantageous composition or in optimum composition has an atomic ratio of tellurium to calcium ranging from 10:1.0 to 1.5:1.0.

Chromium dioxide having an aforesaid combination of calcium and tellurium incorporated therewith can be prepared by mixing intimately chromium trioxide, metallic calcium or any available and suitable calcium compound and metallic tellurium or any available and suitable tellurium compound so as to have a desired atomic percent of chromium, calcium and tellurium and heating the mixture at a temperature of 280° C. to 480° C. in an autoclave producing a high pressure as set forth hereinafter. Advantageous tellurium compound is $TeO_2$, $TeO_3$, $TeCl_4$, $H_2TeO_4$, $H_6TeO_6$, $Na_2TeO_4$, $K_2TeO_4$. Among these compounds, those are more desirable where the tellurium is in hexavalent state, e.g. $H_2TeO_4$, $H_6TeO_6$ or $TeO_3$. Operable calcium compound is $CaO$, $CaO_2$, $CaSO_4$, $Ca(NO_3)_2$, $CaP_2O_7$, $CaCO_3$, $Ca(OH)_2$, $CaCl_2$, $CaCrO_4$, $CaF_2$, $CaI_2$, $CaS$, $CaSi$, $CaSeO_3$, $CaSnO_3$, $CaWO_4$, $CaMoO_4$. In connection with the calcium compound, the best result can be obtained with $CaO_2$.

Said mixture can be made by employing any suitable mixing technique in a wet or dry method. In a wet method it is preferable that the mixture of calcium and tellurium is added with a small amount of nitric acid or aqua regia with bromine water for oxidizing the incorporated calcium compound and tellurium compound prior to mixing with chromium trioxide. The resultant mixture is dried.

The mixture with or without a small amount of water is placed in an autoclave which is made of a corrosion-resistant metal such as stainless steel and which is provided with a thermocouple for measuring the reaction temperature and with a pressure gauge. Care should be taken that the amount of mixture placed in the autoclave is controlled with respect to the inner volume of the autoclave so that a pressure in the autoclave due to the oxygen liberated from chromium trioxide, $NH_3$ gas, nitrogen and water vapor is in the range of 50 to 1000 atmospheres at the desired reaction temperature.

The autoclave having the mixture therein can be heated by any suitable method such as by an electric heater while the temperature of the mixture is being measured. After reaching the reaction temperature, the mixture is maintained at the temperature for a suitable time period which depends on the pressure and the reaction temperature and is then cooled to room temperature (about 15° C. to about 30° C.) in the autoclave. After having cooled, the mixture is removed from the autoclave, washed with water and dried by any suitable method.

It has been discovered according to the invention that the chromium dioxide having the combination of calcium and tellurium incorporated therewith can be improved remarkably in the magnetic coercive force when the starting mixture had added thereto an aqueous solution containing $NH_4^{+1}$ ions or a compound including $NH_4^{+1}$ ions (hereinafter referred to as $NH_4^+$ ions) and is heated in a manner similar to that described above. Any aqueous solution containing $NH_4^+$ ions or compound including $NH_4^+$ ions is operable; for example, aqueous solutions of $NH_3$, $NH_4Cl$, $NH_4F$, $NH_4Br$, $(NH_4)_2SO_4$, $NH_4NO_3$, $HCOONH_4$, $(NH_4)_2CrO_4$, $(NH_4)_2Cr_2O_7$, $(NH_4)_2CO_3$, $NH_4VO_3$, $NH_4SCN$, $(NH_4)_2HPO_4$, $(NH_4)_2C_2O_4$, $NH_4I$ and $CH_3COONH_4$ are suitable. Said aqueous solution varies in the concentration of $NH_4^+$ ions with the amount Thereof. The amount added to the starting mixture depends on the concentration of said aqueous solution and is in a weight ratio of chromium trioxide in the starting mixture to $NH_4^+$ ions ranging from 1.0:0.001 to 1.0:0.15. The higher concentration requires the smaller amount of added aqueous solution. Said starting chromium trioxide can be admixed with at least one compound containing $NH_4^+$ ions in an amount to produce a said weight ratio of $NH_4^+$ ions to chromium trioxide.

The novel effect of additive $NH_4^+$ ions will be readily understood by a comparison between two chromium dioxides which are prepared from a mixture with and without $NH_4^+$ ions in a manner exactly similar to each other. A mixture consisting of 20 grams of chromium trioxide, 0.162 gram of telluric acid, 0.034 gram of calcium monoxide and 2 milliliters of water is prepared. One part of the mixture without $NH_4^+$ ions is heated in an autoclave at 380° C. for 2 hours under a pressure of 370 kg./cm.$^2$. Another part of the mixture is admixed with 4 milliliters of ammonia water (28% by weight of $NH_3$) and then heated in a manner exactly similar to that above. The resultant two chromium dioxides have the following properties.

The properties of the chromium dioxide without $NH_4^+$ are:

Crystal structure: a rutile type structure
Average grain size: 0.5–2.0$\mu$ in length, 0.1–0.4$\mu$ in width
Coercive force: 280 oersteds Maximum magnetization: 4100 gauss
Residual magnetization: 2000 gauss The properties of the chromium dioxide with $NH_4^+$ are:

Crystal structure: a rutile type structure
Average grain size: 0.2–0.5$\mu$ in length, 0.05–0.1$\mu$ in width
Coercive force: 430 oersteds
Maximum magnetization: 4100 gauss
Residual magnetization: 2100 oersteds Presently preferred exemplary embodiments follow.

EXAMPLE 1

One hundred and fifty grams of chromium trioxide, 1.22 grams of telluric acid and 0.427 gram of calcium monoxide are mixed in a mortar. The mixture of starting material is placed into an autoclave of stainless steel.

The inner volume of the autoclave is 200 milliliters. Thirty milliliters of water is added to the mixture in the autoclave. The autoclave is closed and set into an electric furnace of 30 cm. diameter. The autoclave is also connected, through a high pressure tube of stainless steel, to a high pressure controlling system comprising a pressure gauge, a pressure head for automatic recording apparatus and a leak bulb.

The oxygen is introduced into the autoclave up to 20 kg./cm.$^2$ of pressure at room temperature.

The autoclave is heated at a rate of 100° C. per hour and maintained at 390° C. for 2 hours. The inner pressure of the autoclave at 390° C. is 390 kg./cm.$^2$. After heating, the autoclave is slowly cooled to room temperature. The pressure is then released. The reaction product is removed from the autoclave and rinsed with distilled water. The product is black powder and magnetic.

The properties of the product are:

Crystal structure: a rutile type structure
Average grain size: 0.5–1.0$\mu$ in length, 0.1–0.4$\mu$ in width
Coercive force: 320 oersteds
Maximum magnetization: 4200 gauss
Residual magnetization: 2150 gauss

EXAMPLE 2

One hundred grams of chromium trioxide, 0.813 gram of telluric acid and 0.285 gram of calcium monoxide are mixed and placed into an autoclave the same as that of Example 1.

Ten milliliters of water is added to the mixture so that the mixture is in a flowable state. Twenty milliliters of ammonia water (28% solution) is added dropwise to the flowable mixture. The resultant mixture in the autoclave is heated at 390° C. for 2 hours under a pressure of 440 kg./cm.$^2$ and is cooled to room temperature in 16 hours.

The reaction product is removed and rinsed with the distilled water. The product is dried at a temperature below 200° C. The product is black powder and magnetic.

The properties of the product are:
Crystal structure: a rutile type structure
Average grain size: 0.2–0.5$\mu$ in length, 0.01–0.1$\mu$ in width
Coercive force: 470 oersteds
Maximum magnetization: 3870 gauss
Residual magnetization: 2200 gauss

EXAMPLE 3

Fifteen grams of chromium trioxide, 0.229 gram of telluric acid, 0.011 gram of calcium monoxide and 2 grams of ammonium chromate are mixed together and placed into an autoclave, which has 3 cm. of inner diameter, 5.5 cm. inner depth. Five milliliters of water is added to this mixture. The mixture is heated as 440° C. of temperature for 2 hours.

The properties of the product are:
Crystal structure: a rutile type structure
Average grain size: 0.3–0.6$\mu$ in length, 0.05–0.1$\mu$ in width
Coercive force: 430 oersteds Maximum magnetization: 4100 gauss
Residual magnetization: 2040 gauss

EXAMPLE 4

Various mixtures consisting of 20 grams of chromium trioxide, 0.163 gram of telluric acid and various amounts of calcium monoxide are prepared. These mixtures are placed into the autoclave and then are admixed with 2 milliliters of water and 4 milliliters of ammonia water (28% solution).

The inner volume of the autoclave is 40 milliliters. The heating temperatures are 380° C.–410° C. and the heating times are 1–2 hours.

The heating temperatures are controlled ±2° C.

These treatments clarify the effect of the amount of calcium monoxide in the starting material on the properties of the reaction product.

Table 1 shows the relation of the amount of calcium monoxide and magnetic properties of the product.

TABLE 1.—MAGNETIC PROPERTIES OF FERROMAGNETIC CHROMIUM OXIDE INCLUDING VARIOUS AMOUNTS OF CALCIUM

| | CaO [1] | Hc (oersteds) | Br (gauss) | $4\pi$ Im (gauss) |
|---|---|---|---|---|
| No. of treatment: | | | | |
| 1 | 0.5 | 510 | 2,150 | 4,100 |
| 2 | 1.0 | 480 | 2,200 | 4,100 |
| 3 | 3.0 | 500 | 2,150 | 4,100 |
| 4 | 5.0 | 450 | 1,900 | 3,820 |
| 5 | 10.0 | 370 | 1,600 | 3,260 |

[1] Atomic percent of Ca relative to Cr.

EXAMPLE 5

A starting mixture, which consists of 20 grams of chromium trioxide, 0.163 gram of telluric acid and 0.057 gram of calcium monoxide is admixed with water and various amounts of ammonia water (28% solution). Water is 10% by weight relative to chromium trioxide. The amount of ammonia water (28% solution) is ranging from 1% to 50% by weight relative to chromium trioxide.

The resultant mixtures are heated, cooled and washed in a manner the same as that of Example 2.

The resultant ferromagnetic chromium dioxides have superior magnetic properties as listed in Table II.

TABLE II.—MAGNETIC PROPERTIES OF FERROMAGNETIC CHROMIUM OXIDE REACTED WITH VARIOUS AMOUNTS OF AMMONIUM

| | Ammonia water [1] | Hc (oersteds) | Br (gauss) | $4\pi$ Im (gauss) |
|---|---|---|---|---|
| No. of treatment: | | | | |
| 1 | 5.0 | 350 | 1,950 | 4,100 |
| 2 | 10.0 | 380 | 2,200 | 4,050 |
| 3 | 20.0 | 505 | 2,150 | 3,950 |
| 4 | 30.0 | 520 | 2,020 | 3,800 |
| 5 | 50.0 | 380 | 1,450 | 3,340 |

[1] 28% sol. (weight percent relative to $CrO_3$).

What is claimed is:

1. A ferromagnetic chromium dioxide having a combination of calcium and tellurium incorporated therewith, said combination being in an amount not more than 30 atomic percent in total and consisting essentially of 0.01 to 10 atomic percent of calcium and 0.01 to 20 atomic percent of tellurium.

2. A ferromagnetic chromium dioxide according to claim 1, wherein said combination is in an amount not more than 15 atomic percent in total and consists essentially of 0.01 to 5 atomic percent of calcium and 0.01 to 10 atomic percent of tellurium.

3. A ferromagnetic chromium dioxide according to claim 1, wherein said combination is in an amount not more than 5 atomic percent in total and consists essentially of 0.01 to 2 atomic percent of calcium and 0.01 to 3 atomic percent of tellurium.

4. A ferromagnetic chromium dioxide according to claim 3, wherein said ferromagnetic chromium dioxide consists essentially of finely divided acicular particles of 0.1 to 2.0$\mu$ in length and 0.01 to 0.4$\mu$ in width and is in a single phase of rutile type crystalline structure.

5. A ferromagnetic chromium dioxide according to claim 1, wherein said combination is in an atomic ratio of tellurium to calcium ranging from 10:1.0 to 1.5:1.0.

6. A method for making a ferromagnetic chromium dioxide material comprising providing a mixture of chromium trioxide, a tellurium compound selected from the group consisting of $TeO_2$, $TeO_3$, $TeCl_4$, $H_2TeO_4$, $H_6TeO_6$, $Na_2TeO_4$ and $K_2TeO_4$ and a calcium compound selected from the group consisting of CaO, $CaO_2$, $CaSO_4$, $Ca(NO_3)_2$, $CaP_2O_7$, $CaCO_3$, $Ca(OH)_2$, $CaCl_2$, $CaCrO_4$, $CaF_2$, $CaI_2$, CaS, CaSi, $CaSeO_3$, $CaSnO_3$, $CaWO_4$ and $CaMoO_4$ in an atomic percent of Cr: 99.98 to 70
Te: 0.01 to 20
Ca: 0.01 to 10, heating said mixture in the presence of an aqueous solution containing $NH_4^+$ ions selected from the group consistig of aquerous solutions of $NH_3$, $NH_4Cl$, $NH_4F$, $NH_4Br$, $(NH_4)_2SO_4$, $NH_4NO_3$, $HCOONH_4$, $(NH_4)_2CrO_4$, $(NH_4)_2Cr_2O_7$, $(NH_4)_2CO_3$, $NH_4VO_3$, $NH_4SCN$, $(NH_4)_2HPO_4$, $(NH_4)_2C_2O_4$, $NH_4I$ and $CH_3COONH_4$ at a temperature of 280° C. to 480° C. at [a high pressure] a pressure of 50 to 1000 atmospheres.

7. A method for making ferromagnetic chromium dioxide material according to claim 6, wherein said aqueous solution contains $NH_4^+$ ions in an amount to produce a weight ratio of $CrO_3:NH_4^+=1:0.001$ to 1:0.15.

8. A method for making a ferromagnetic chromium dioxide material according to claim 6, wherein said tellurium compound is selected from the group consisting of $H_2TeO_4$, $H_6TeO_6$ and $TeO_3$.

9. A method for making a ferromagnetic chromium dioxide material according to claim 6, wherein said calicum compound is $CaO_2$.

References Cited

UNITED STATES PATENTS 3,243,260 3/1966 Kubata et al. ______ 252—62.51

TOBIAS E. LEVOW, Primary Examiner

J. COOPER, Assistant Examiner

U.S. Cl. X.R.

23—145